United States Patent
Hayashi et al.

(10) Patent No.: US 7,091,994 B2
(45) Date of Patent: Aug. 15, 2006

(54) METHOD, SYSTEM, AND COMPUTER PROGRAM FOR DISPLAYING SCREEN INFORMATION

(75) Inventors: Keiko Hayashi, Tokyo (JP); Kakuichi Shiomi, Tokyo (JP); Shoichi Kagayama, Tokyo (JP)

(73) Assignees: NEC Corporation, Tokyo (JP); Electronic Navigation Research Institute, Tokyo (JP)

( * ) Notice: Subject to any disclaimer, the term of this patent is extended or adjusted under 35 U.S.C. 154(b) by 94 days.

(21) Appl. No.: 10/763,160

(22) Filed: Jan. 26, 2004

(65) Prior Publication Data

US 2004/0222942 A1 Nov. 11, 2004

(30) Foreign Application Priority Data

Jan. 24, 2003 (JP) ............................. 2003-015661

(51) Int. Cl.
*G09G 5/00* (2006.01)
(52) U.S. Cl. ...................................... 345/629; 715/781
(58) Field of Classification Search ................ 345/629, 345/156; 715/790–791
See application file for complete search history.

(56) References Cited

U.S. PATENT DOCUMENTS

| | | | | |
|---|---|---|---|---|
| 6,031,530 A | * | 2/2000 | Trueblood | 715/791 |
| 6,151,081 A | * | 11/2000 | Gold et al. | 348/756 |
| 6,304,259 B1 | * | 10/2001 | DeStefano | 715/805 |
| 6,448,956 B1 | * | 9/2002 | Berman et al. | 345/156 |
| 6,512,529 B1 | * | 1/2003 | Janssen et al. | 715/790 |

FOREIGN PATENT DOCUMENTS

| JP | H05-347735 A | 12/1993 |
|---|---|---|
| JP | H06-019669 A | 1/1994 |
| JP | H06-259521 A | 9/1994 |
| JP | H07-336659 A | 12/1995 |
| JP | H08-083160 A | 3/1996 |
| JP | H09-322095 A | 12/1997 |
| JP | H11-066083 A | 3/1999 |
| JP | 2000-035842 A | 2/2000 |
| JP | 2000-035847 A | 2/2000 |
| JP | 2000-113180 A | 4/2000 |

* cited by examiner

*Primary Examiner*—Kee M. Tung
*Assistant Examiner*—Jin-Cheng Wang
(74) *Attorney, Agent, or Firm*—Sughrue Mion, PLLC

(57) ABSTRACT

A plurality of windows are contracted in scale and presented on the same display without interfering with a main display window. By dragging and dropping any contracted window with a mouse, the contracted window is displayed on a sub display in an expanded scale. Functions such as voice recognition are assigned to any contracted window.

27 Claims, 5 Drawing Sheets

METHOD, SYSTEM, AND COMPUTER PROGRAM FOR DISPLAYING SCREEN INFORMATION

BACKGROUND OF THE INVENTION

1. Field of the Invention

The present invention relates to display systems and, in particular, to a display system that presents high density information taking into consideration priority of screen information and ease of use. Such a system is for use in, for example, air traffic control.

2. Description of the Related Art

Display systems for use in air control must present many pieces of information to air controllers. All pieces of information are not necessarily presented all the time. Frequency at which information is displayed is different from information type to information type. More specifically, the information presented on the air control display system is categorized into 1) information the air controller must constantly keep track of in detail, 2) information that requires no continuous tracking but must be still checked at intervals, and 3) information that must be checked if a change occurs in situation.

Known systems that present information in an integrated fashion display a plurality of pieces of information different in frequency of presentation, namely, priority using a plurality of displays. Such a system requires a large installation area because a plurality of displays must be installed. To verify all screen information, the air controller must take a view at a wide angle in comparison with the case in which a single display is used. Such a system is not very much satisfactory in terms of operability.

Another known display system provides a plurality of pieces of screen information on the screen of a single display apparatus in a window format. The window format presentation allows windows to be displayed in an overlapping state. A window presenting information having a low priority is presented behind a window of high priority. As necessary, the system may be operated to show the window of low priority in front. In the window format presentation, a particular window may be contracted or expanded in size as necessary.

Such a system is unable to immediately present information on a window presented behind another window. To reference the information, a front and back relationship of windows must be switched. The same switching operation must also be performed to reference a window that is hidden behind a particular window that has been expanded on the screen. The switching operation that must be frequently performed by each air traffic controller becomes one cause to an increase in the workload of the air traffic controller.

One of known display systems, aiming at the reduction of the controller workload, presents only windows of high priority and keeps, in a hidden state, windows of low priority unless a particular operation is performed. Although this display system maintains an excellent operability during normal operating conditions, an operation that is not usually performed must be performed to display information of low priority. An operation to present a window that is hidden as a result of expansion of another particular window must be still performed. This system is far from the one having improved general operability.

In summary, the known display systems have the following drawbacks.

Visibility of the screen information is reduced if a plurality of windows is concurrently presented. This is because overlapping windows present difficulty to the controller in viewing the screen information.

If one window is presented in a close-up fashion, another widow is hidden. The one window, selected and expanded in a close-up view, hides another window.

The controller has difficulty in watching and noticing a change in the state of each window. With windows overlapping each other, information is hidden and cannot be seen.

An operation using a mouse, etc. is complex. For example, to present a plurality of windows at the same time, the display system must be adjusted for a required portion of each window to remain appearing.

The display apparatus for use in air control has information the controller is occasionally forced to give up displaying because of limited screen space. This is because a single screen (window) is designed to present Information of minimum amount possible to reduce the frequency of switching of the windows, which could lead to an increase in the workload on the controller.

SUMMARY OF THE INVENTION

Accordingly, it is an object of the present invention to provide a multi-display and multi-window system that presents information at a high density with the ease of use assured.

To overcome the drawbacks, the present invention provides the following means.

The present invention relates to a method of an information processing apparatus for concurrently displaying a plurality of pieces of screen information, output therefrom, on a plurality of display apparatuses. The method of the present invention includes a first step for partitioning the screen of one display apparatus into a main display window and a plurality of contracted display windows, each window presenting single piece of screen information, in a manner such that the windows do not overlap each other, a second step for presenting the same screen information on both a first contracted display window and the main display window, a third step for presenting the same screen information on both a second contracted display window and another display apparatus, a fourth step for presenting screen information on third contracted display windows other than the first and second contracted display windows, and a fifth step for presenting screen information, presented on one of the third contracted display windows, on both the second contracted display window and the other display apparatus in response to an operation to the information processing apparatus.

The fifth step preferably includes presenting the screen information, presented on the one of the third contracted display windows, on the second contracted display window and the other display apparatus when the screen information presented on the one of the third contracted display windows is dragged and dropped to the second contracted display window.

The method may further include a sixth step for modifying a correspondence between the currently presented screen information and the contracted display window in response to the fifth step.

The method may further include a seventh step for performing a predetermined process when screen information presented on another contracted display window is dragged and dropped to a fourth contracted display window wherein at least one of the third contracted display windows is the fourth contracted display window.

The present invention relates to a screen information presentation system having an information processing apparatus and a plurality of display apparatuses. The screen information presentation system of the present invention includes a first unit for partitioning the screen of one display apparatus into a main display window and a plurality of contracted display windows, each window presenting single piece of screen information, in a manner such that the windows do not overlap each other, a second unit for presenting the same screen information on both a first contracted display window and the main display window, a third unit for presenting the same screen information on both a second contracted display window and another display apparatus, a fourth unit for presenting screen information on third contracted display windows other than the first and second contracted display windows, and a fifth unit for presenting screen information, presented on one of the third contracted display windows, on both the second contracted display window and the other display apparatus in response to an operation to the information processing apparatus.

The fifth unit may present the screen information, presented on the one of the third contracted display windows, to the second contracted display window and the other display apparatus when the screen information presented on the one of the third contracted display windows is dragged and dropped to the second contracted display window.

The screen information presentation system may further include a sixth unit for modifying a correspondence between the currently presented screen information and the contracted display window in response to an operation of the fifth unit.

The screen information presentation system may further include a seventh unit for performing a predetermined process when screen information presented on another contracted display window is dragged and dropped to a fourth contracted display window wherein at least one of the third contracted display windows is the fourth contracted display window.

The present invention relates to a computer program for an information processing apparatus connected to a plurality of display devices. The computer program causes the information process apparatus to perform a first step for partitioning the screen of one display apparatus into a main display window and a plurality of contracted display windows, each window presenting single piece of screen information, in a manner such that the windows do not overlap each other, a second step for presenting the same screen information on both a first contracted display window and the main display window, a third step for presenting the same screen information on both a second contracted display window and another display apparatus, a fourth step for presenting screen information on third contracted display windows other than the first and second contracted display windows, and a fifth step for presenting screen information, presented on one of the third contracted display windows, on both the second contracted display window and the other display apparatus in response to an operation to the information processing apparatus.

The fifth step may include presenting the screen information, presented on the one of the third contracted display windows, to the second contracted display window and the other display apparatus when the screen information presented on the one of the third contracted display windows is dragged and dropped to the second contracted display window.

The computer program may cause the information processing apparatus to perform a sixth step for modifying a correspondence between the currently presented screen information and the contracted display window in response to the fifth step.

The computer program may cause the information processing apparatus to perform a seventh step for performing a predetermined process when screen information presented on another contracted display window is dragged and dropped to a fourth contracted display window wherein at least one of the third contracted display windows is the fourth contracted display window.

The present invention provides a display system including a unit for roughly keeping track of a plurality of windows in a contracted scale, a unit for changing a display position of a contracted display window, a unit for modifying the number of contracted windows, and a unit for displaying a selected contracted window in an expanded scale on a sub display. The display system presents information efficiently taking into consideration priority of information that must be kept track of in detail constantly, and information that must be kept track of in detail not constantly but at intervals. The display system not only achieves efficient displaying but also allows the controller to efficiently perform busy operations.

A display system of the present invention further includes a unit for assigning, to one of the contracted display windows as a function window, a variety of functions including voice recognition, and presentation to a head mount display, a unit for shifting any contracted display window to the function window using a drag and drop operation, and a unit for validating a function assigned to the contracted display window dropped to the function window, The display system thus efficiently assists a busy controller.

DESCRIPTION OF THE PREFERRED EMBODIMENTS

Figure 1:
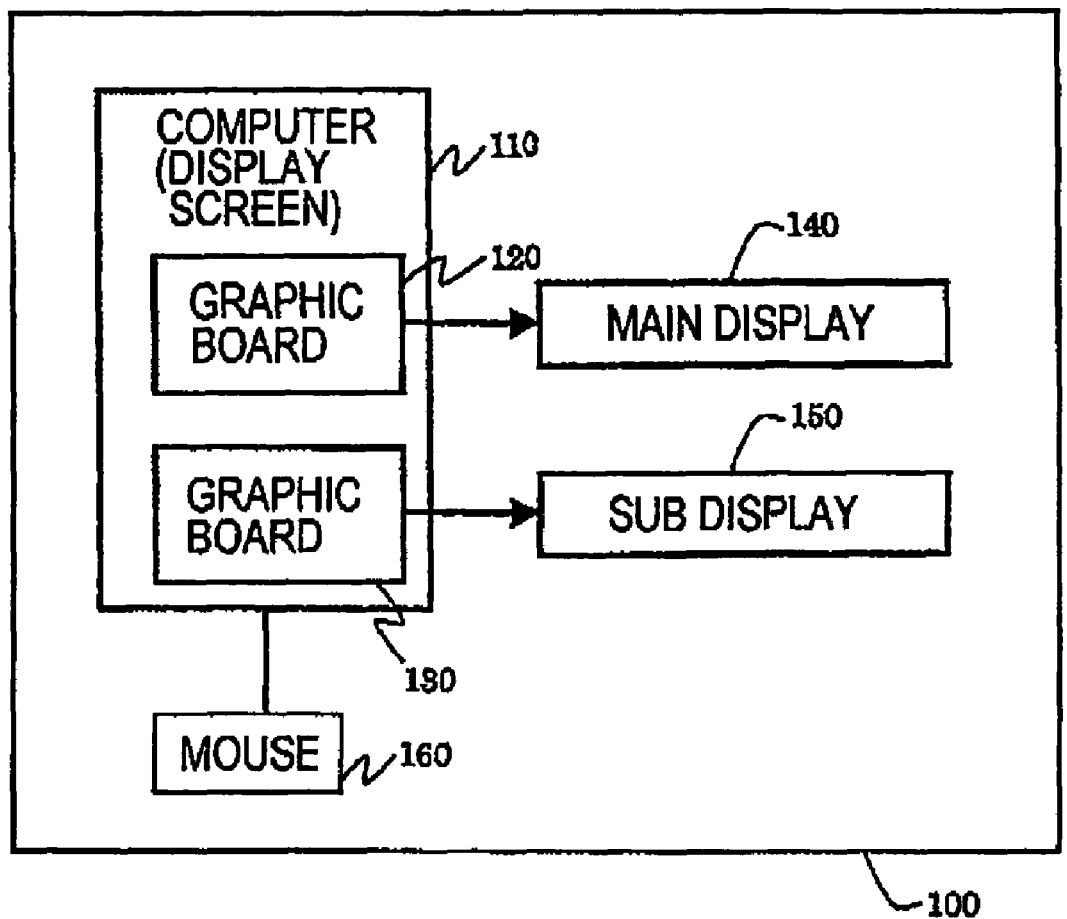
FIG. 1 is a block diagram of first and second preferred embodiments of the present invention.

The embodiments of the present invention are now described with reference to the drawings. Referring to FIG. 1, a display system 100 of a first preferred embodiment of the present invention includes a computer (display controller) 110 that operates under the control of a program, a plurality of graphic boards 120 and 130, a display apparatus (main display) 140 for presenting a main window and contracted windows, a display apparatus (sub display) 150 for presenting a contracted window selected in the main display 140 thereof in an expanded scale, and a mouse 160 a user operates for screen operation.

Figure 2:
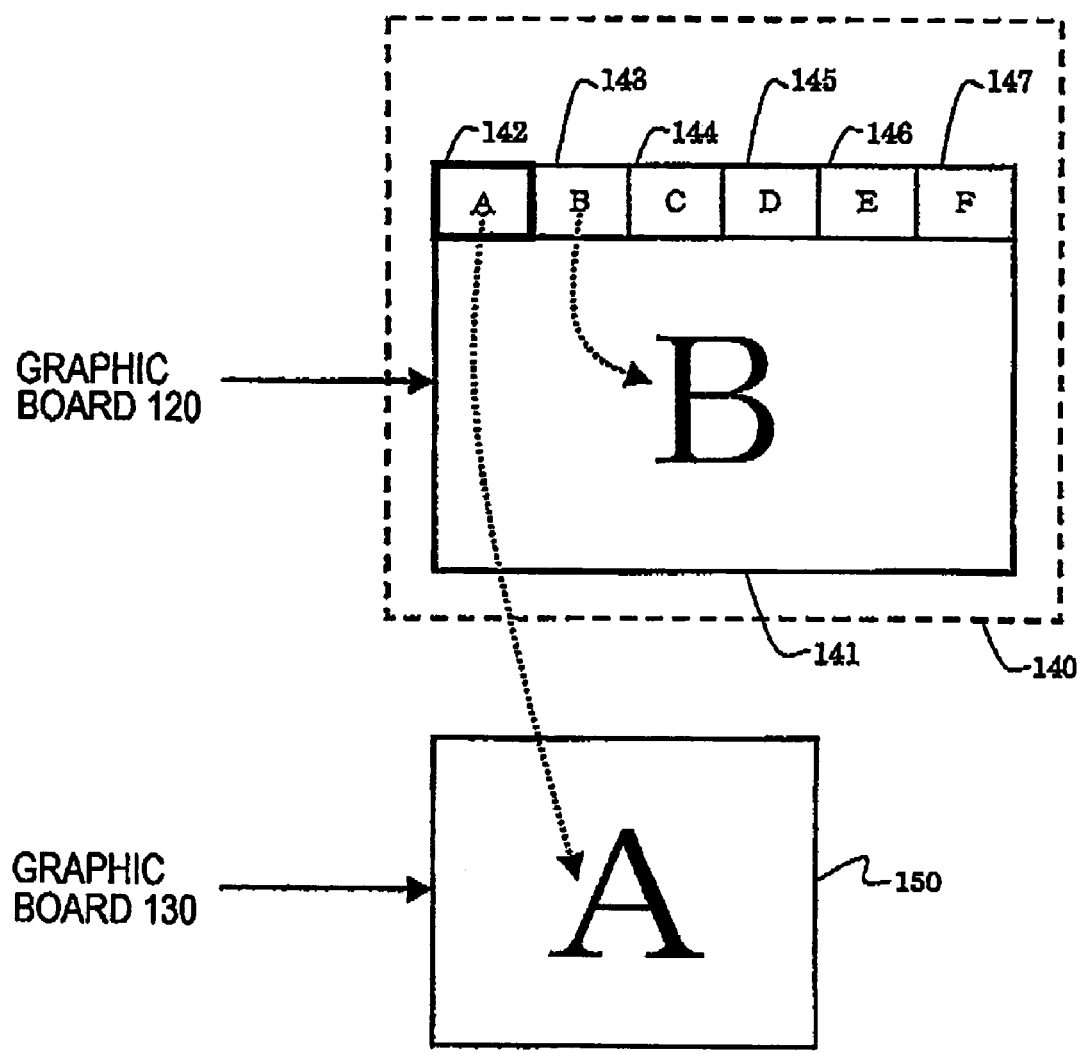
FIG. 2 illustrates the layout of windows of a display system in accordance with the first preferred embodiment of the present invention.

The computer 110 operates under the control of a typically available operating system (OS). The computer 110 performs processes available from the OS, and programs running on the OS. With reference to FIG. 2, the processes performed by the computer 110 will now be discussed.

In a multi-display process, display data is concurrently output to a plurality of displays 140 and 150 based on a multi-display function of the OS, and functions of graphic boards.

In a mouse input process, a mouse cursor is moved within the screen of the main display 140 in response to an input on the mouse 160, and a predetermined command is input in accordance with the position of the mouse 160 and the operation of mouse buttons on the mouse 160.

In a screen partition process, a plurality of pieces of screen information is concurrently presented on a main display window 141 and contracted display windows 142–147. Each single piece of screen information may be a desktop screen of the OS, an execution window of an application software program, a moving picture obtained from a video camera, a still picture, a monitor screen of a measurement apparatus, or the like. The contracted display windows 142–147 are presented at locations not overlapping the main display window 141. The contracted display windows 142–147 are preferably presented in a manner such that the contracted display windows 142–147 do not overlap each other. Furthermore, icons, etc. are preferably presented in a non-overlapping manner.

In a contracted display window movement process, the screen information presented on any contracted display window is moved to the sub display contracted display window 142 and a main display contracted display window 143. Each of the windows will be discussed later.

In a display window interlink process, the screen information presented on the sub display contracted display window 142 is also presented on a sub display 150. The sub display contracted display window 142 is one of the contracted display windows, but is different from the other contracted display windows in that the sub display contracted display window 142 presents, in a contracted scale, the same screen information as the one presented on the sub display 150.

The display system 100 employs one sub display contracted display window 142 because a single sub display 150 is used. If two or more sub displays are employed by adding sub displays and graphic boards, the sub display contracted display windows 142 of the same number as the sub displays may be provided. Similarly, the main display contracted display window 143 presents the same screen information as the one displayed on the main display window 141.

The main display 140 captures display data output from the computer 110 and presents the display data on the screen thereof. The specifications of the main display 140 may be selected taking into consideration graphic performance of the computer 110. The size of the main display 140 may be selected taking into consideration applications and installation locations.

The specifications of the sub display 150 may be selected taking into consideration the graphic performance of the computer 110. The size of the sub display 150 may also be selected taking into consideration applications and installation locations thereof. The maximum number of sub displays 150 to be connected depends on the number of graphic boards. The display area of the sub display 150 is at least larger than the area of the contracted display window.

Figure 3:
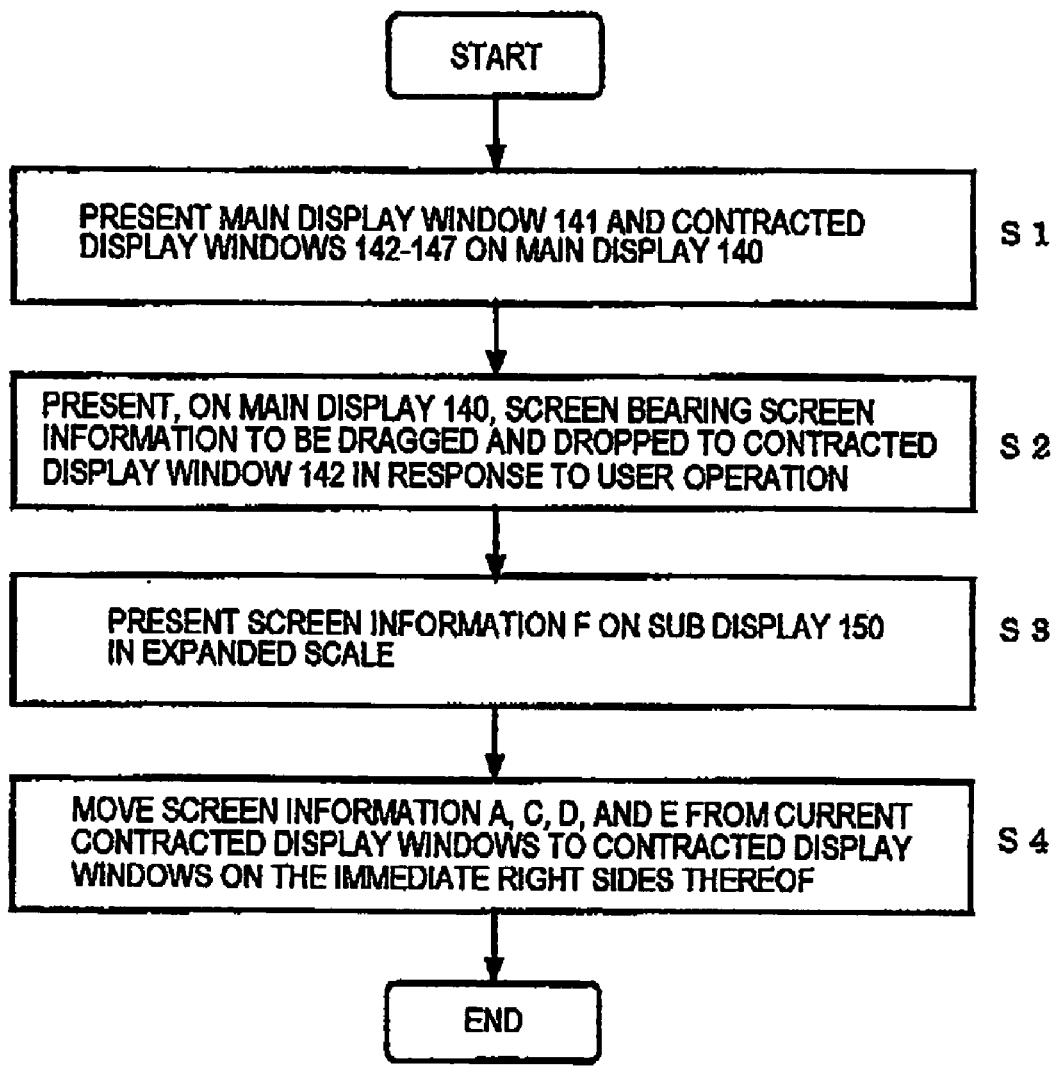
FIG. 3 is a flowchart illustrating the operation of the display system in accordance with the first preferred embodiment of the present invention.

The operation of the display system 100 will now be discussed with reference to a flowchart shown in FIG. 3.

When the OS and programs relating to required processes are initiated, screen information is displayed on the main display window 141 and the contracted display windows 142–147 (step S1). The contracted display windows 142–147 are presented at predetermined locations not overlapping icons, windows, etc. within the screen of the main display 140.

As shown in FIG. 2, screen information A, presented on the sub display contracted display window 142 in a contracted scale, is also presented on the sub display 150 in an interlink manner. Screen information B, presented on the main display contracted display window 143 in a contracted scale, is presented on the main display window 141 in an interlink manner. Screen information C–F is presented on the contracted display windows 144–147, respectively.

In this state, a user of the display system 100 drags and drops the contracted display window 147 to the sub display contracted display window 142, for example. The display system 100 displays the process in which the screen information F displayed on the contracted display window 147 is moved across the screen of the main display and is then input to the sub display contracted display window 142 (step S2). The display content on the sub display 150 is switched from the screen information A to the screen information F (step S3). In other words, the screen information F is displayed on the sub display 150 in an expanded scale. The screen information A is shifted in position from the sub display contracted display window 142 to the contracted display window 144. Along with this position shifting, the screen information C, D, and E, displayed on the contracted display windows 144, 145, and 146 respectively, is displayed on contracted display windows respectively on the immediate right sides of the contracted display windows 144, 145, and 146 (step S4). Subsequent to step S4, the screen information B, F, B, A, C, D, E, and F is arranged on the contracted display windows 142–147 and the sub display 150 in that order, respectively.

The display system 100 presents a plurality of windows on the contracted display windows in a contracted scale while continuously presenting a display, requiring continuous presentation, on the main display window.

Information density per screen becomes higher than in the conventional art. Since a contracted display window is presented in a close-up view in time of need, the windows are flexibly laid out taking into the priority of information in response a change in the situation. Since the above operation is performed without affecting the main display window, the most important information remains appearing with high priority.

A second preferred embodiment of the present invention will now be discussed with reference to the drawings. The basic hardware structure of the second preferred embodiment is identical to that of the display system 100 in the first preferred embodiment, and the discussion thereof is omitted.

Figure 4:
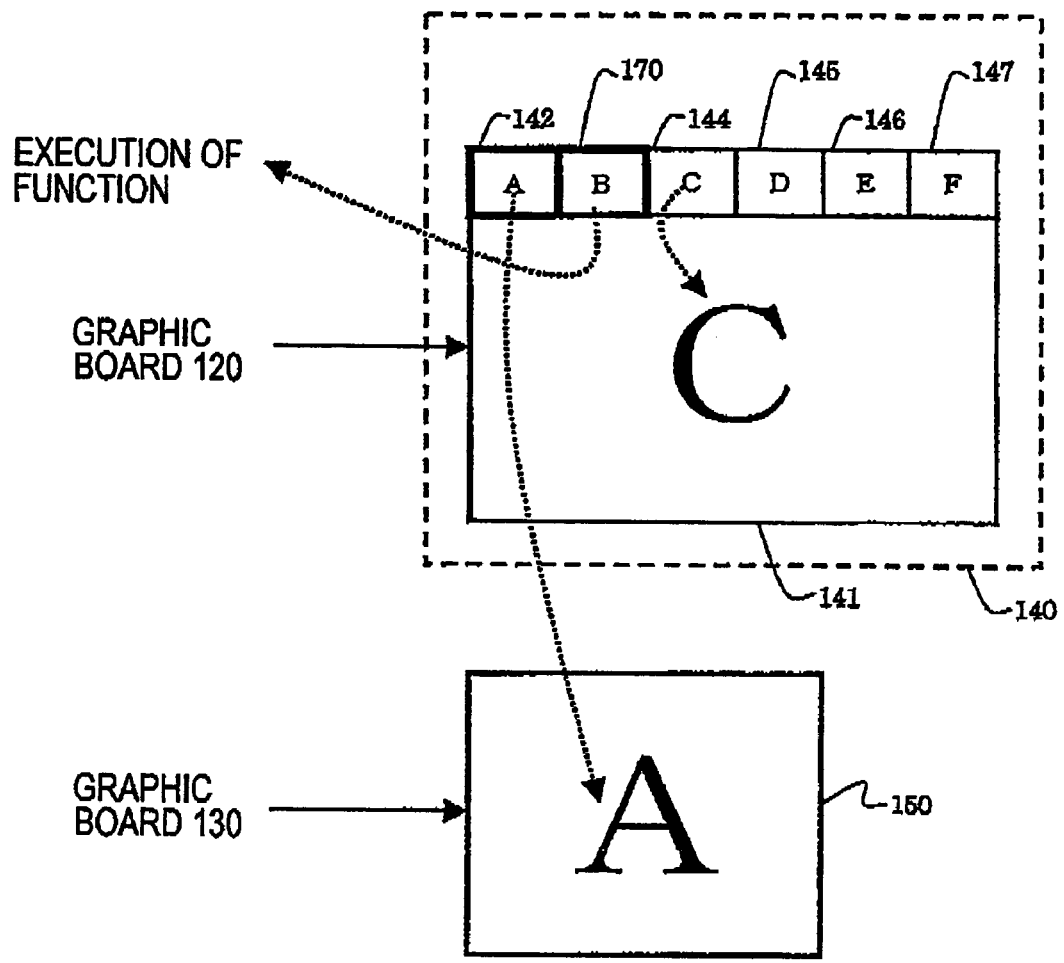
FIG. 4 illustrates the layout of windows of a display system in accordance with the second preferred embodiment of the present invention.

The difference between the first preferred embodiment and the second preferred embodiment is that a new type is added to the contracted display windows in the second preferred embodiment The contracted display windows in the first preferred embodiment include the three types of windows, namely, the sub display contracted display window 142, the main display contracted display window 143, and the remaining contracted display windows 144–147. Referring to FIG. 4, a function window 170 is included in the second preferred embodiment. If the screen information from another contracted display window is dragged and dropped to the function window 170, a pre-assigned process is performed on the screen information or on the function window 170. A plurality of function windows 170 may be arranged as a plurality of sub display contracted display windows 142 is arranged.

In accordance with the second preferred embodiment of the present invention, the computer 110 performs a function assignment process for assigning a process that is executed on the screen information displayed on the function window 170, in addition to the multi-display process, the mouse input process, the screen partition process, the contracted display window movement process, and the display window interlink process. In the display system 100, a plurality of correspondences may be set up between a process assigned in the function assignment process and screen information, and a plurality of correspondences may be set up between the process assigned in the function assignment process and the function window. For example, processes may be different from information type to information type of the screen information. The computer 110 performs a variety of processes assigned in the function assignment process.

The processes assigned to the function window may include a voice recognition process performed on voice data relating to the screen information, a process for presenting the screen information on a display apparatus such as a head mount display, a process for handing over control for a process of the screen information to another computer connected to the computer 110 through a network.

Figure 5:
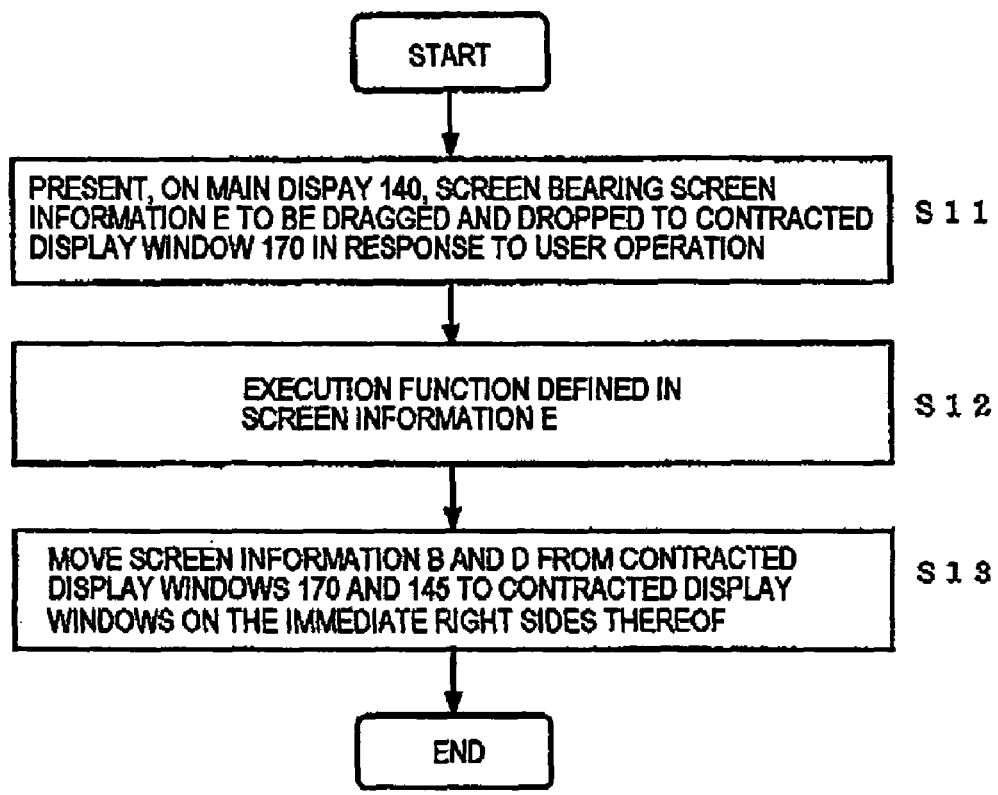
FIG. 5 is a flowchart of the operation of the display system in accordance with the second preferred embodiment of the present invention.

The operation of the second preferred embodiment will now be discussed with reference to FIG. 5. The main display 140 and the sub display 150 now present the screen information as shown in FIG. 4. Using the mouse, a user drags and drops the screen information E on the contracted display window 146 to the function window 170. In response to the user operation, the display system 100 displays a process in which the screen information E is dragged and dropped from the contracted display window 146 to the function window 170 (step S11). A predetermined process is performed on the screen information E (step S12). The screen information E is displayed on the function window 170, the screen information B displayed on the function window 170 immediately before dropping is displayed on the contracted display window 145, and the screen information D displayed on the contracted display window 145 is displayed on the contracted display window 146 (step S13). The screen information F displayed on the contracted display window 147 stays there.

In accordance with the second preferred embodiment of the present invention, the operability of the display system 100 is enhanced by assigning a proper process to the function window.

The preferred embodiments of the present invention have been discussed. The present invention is not limited to these preferred embodiments. Those of ordinary skill in the art will recognize that change and modification of the above preferred embodiments are possible without departing from the scope of the present invention.

In the above preferred embodiments, the main display 140 is partitioned into the one main display window and the six contracted display windows. The present invention is not limited to this partitioning. It is obvious to those skilled in the art that the number of windows may be reduced or increased depending on the display area of the main display 140.

In the main display of the above-referenced preferred embodiments, a row of contracted display windows is arranged along the upper edge of the screen of the main display and the main display window is arranged below the row of contracted display windows. The present invention is not limited to this layout of the main display window and the contracted display windows. The display layout may be modifiable in response to the user operation.

The display system employs the two display apparatuses in the above-referenced preferred embodiments. The present invention may be applied to a system having three or more display apparatuses.

Information density is heightened taking into consideration the priority of information. This is because a plurality of contracted display windows is presented together with the main display window. A selected contracted display window may be displayed on the sub display in an expanded scale.

Operation efficiency is increased by assigning, to a window, a function for assisting a controller. A display window other than the main display window is assigned a variety of functions including voice recognition, presentation of the screen information to a head mount display, a process for receiving an operation from another personal computer connected through a network, etc.

What is claimed is:

1. A method for displaying a plurality of pieces of screen information, on a plurality of display apparatuses, the method comprising:

partitioning the screen of a first display apparatus into a main display window and a plurality of contracted display windows in a manner such that the windows do not overlap each other;

presenting first screen information on both a first contracted display window of the plurality of contracted display windows and the main display window;

presenting second screen information on both a second contracted display window of the plurality of contracted display windows and a second display apparatus;

presenting third screen information on a third contracted display window of the plurality of contracted display windows; and changing the second contracted display window and the second display apparatus to present the third screen information thereon in response to an operation to the information processing apparatus.

2. A method according to claim 1, wherein the operation comprises dragging and dropping the third screen information presented on the third contracted display window to the second contracted display window.

3. A method according to claim 1, further comprising presenting the second screen information on the third or a fourth contracted display window of the plurality of contracted display windows in response to the operation.

4. A method according to claim 1, further comprising performing a predetermined process when the first, second or third screen information is dragged and dropped to a fourth contracted display window of the plurality of contracted display windows.

5. A method according to claim 1, wherein the main display window encompasses a majority of the display apparatus.

6. A method according to claim 1, wherein the second and third contracted display windows are the same size.

7. A method according to claim 1, wherein the second and third contracted display windows are arranged along the periphery of the main display window.

8. A method according to claim 1, wherein, when the second information is displayed on both a second contracted display window and a second display apparatus, the second contracted display window and a second display apparatus display only the same information, in different scales.

9. A screen image information presentation system having an information processing apparatus and a plurality of display apparatuses, the system comprising:

first means for partitioning the screen of a first display apparatus into a main display window and a plurality of contracted display windows in a manner such that the windows do not overlap each other;

second means for presenting first screen information on both a first contracted display window of the plurality of contracted display windows and the main display window;

third means for presenting second screen information on both a second contracted display window of the plurality of contracted display windows and a second display apparatus;

fourth means for presenting third screen information on a third contracted display window of the plurality of contracted display windows; and fifth means for changing the second contracted display window and the second display apparatus to present the third screen information thereon in response to an operation to the information processing apparatus.

10. An screen information presentation system according to claim 9, wherein the operation comprises dragging and dropping the third screen information presented on of the third contracted display window to the second contracted display window.

11. A screen information presentation system according to claim 9, further comprising sixth means for presenting the second screen information on the third or a fourth contracted display window of the plurality of contracted display windows in response to the operation.

12. A screen information presentation system according to claim 9, further comprising seventh means for performing a predetermined process when the first, second or third screen information is dragged and dropped to a fourth contracted display window of the plurality of contracted display windows.

13. A method according to claim 9, wherein the main display window encompasses a majority of the display apparatus.

14. A method according to claim 9, wherein the second and third contracted display windows are the same size.

15. A method according to claim 9, wherein the second and third contracted display windows are arranged along the periphery of the main display window.

16. A method according to claim 9, wherein, when the second information is displayed on both a second contracted display window and a second display apparatus, the second contracted display window and a second display apparatus display only the same information, in different scales.

17. A computer readable medium having stored thereon computer executable instructions for performing a method for displaying a plurality of pieces of screen information, output therefrom, on a plurality of display apparatuses, the method comprising:

partitioning the screen of a first display apparatus into a main display window and a plurality of contracted display windows in a manner such that the windows do not overlap each other;

presenting first screen information on both a first contracted display window of the plurality of contracted display windows and the main display window;

presenting second screen information on both a second contracted display window of the plurality of contracted display windows and a second display apparatus;

presenting third screen information on a third contracted display window of the plurality of contracted display windows; and changing the second contracted display window and the second display apparatus to present the third screen information thereon in response to an operation to the information processing apparatus.

18. A computer program according to claim 17, wherein the operation comprises dragging and dropping the third screen information presented on the third contracted display window to the second contracted display window.

19. A computer program according to claim 17, further comprising presenting the second screen information on the third or a fourth contracted display window of the plurality of contracted display windows in response to the operation.

20. A computer program according to claim 17, further comprising performing a predetermined process when the first, second or third screen information is dragged and dropped to a fourth contracted display window of the plurality of contracted display windows.

21. A computer readable medium having stored thereon computer executable instructions for performing a method according to claim 17, wherein the main display window encompasses a majority of the display apparatus.

22. A computer readable medium having stored thereon computer executable instructions for performing a method according to claim 17, wherein the second and third contracted display windows are the same size.

23. A computer readable medium having stored thereon computer executable instructions for performing a method according to claim 17, wherein the second and third contracted display windows are arranged along the periphery of the main display window.

24. A computer readable medium having stored thereon computer executable instructions for performing a method according to claim 17, wherein, when the second information is displayed on both a second contracted display window and a second display apparatus, the second contracted display window and a second display apparatus display only the same information, in different scales.

25. A method for displaying a plurality of pieces of screen information on a plurality of display apparatuses, the method comprising:

partitioning the screen of a first display apparatus into a main display window and a plurality of contracted display windows in a manner such that the windows do not overlap each other;

presenting first screen information on both a first contracted display window of the plurality of contracted display windows and the main display window;

presenting second screen information on both a second contracted display window of the plurality of contracted display windows and a second display apparatus;

presenting third screen information on a third contracted display window of the plurality of contracted display windows; and changing at least one of: (1) both the second contracted display window and the second display apparatus to present the third screen information thereon; or (2) both the first contracted display and the main display window to present the third screen information thereon, in response to an operation to the information processing apparatus.

26. A screen image information presentation system having an information processing apparatus and a plurality of display apparatuses, the system comprising:

first means for partitioning the screen of a first display apparatus into a main display window and a plurality of contracted display windows in a manner such that the windows do not overlap each other;

second means for presenting first screen information on both a first contracted display window of the plurality of contracted display windows and the main display window;

third means for presenting second screen information on both a second contracted display window of the plurality of contracted display windows and a second display apparatus;

fourth means for presenting third screen information on a third contracted display window of the plurality of contracted display windows; and fifth means for changing at least one of: (1) both the second contracted display window and the second display apparatus to present the third screen information thereon; or (2) both the first contracted display and the main display window to present the third screen information thereon, in response to an operation to the information processing apparatus.

27. A computer readable medium having stored thereon computer executable instructions for performing a method for displaying a plurality of pieces of screen information, output therefrom, on a plurality of display apparatuses, the method comprising:

partitioning the screen of a first display apparatus into a main display window and a plurality of contracted display windows-in a manner such that the windows do not overlap each other;

presenting first screen information on both a first contracted display window of the plurality of contracted display windows and the main display window;

presenting second screen information on both a second contracted display window of the plurality of contracted display windows and a second display apparatus;

presenting third screen information on a third contracted display window of the plurality of contracted display windows; and changing at least one of: (1) both the second contracted display window and the second display apparatus to present the third screen information thereon; or (2) both the first contracted display and the main display window to present the third screen information thereon, in response to an operation to the information processing apparatus.

* * * * *